(12) United States Patent
Soldevila et al.

(10) Patent No.: US 9,762,393 B2
(45) Date of Patent: Sep. 12, 2017

(54) ONE-TO-MANY MATCHING WITH APPLICATION TO EFFICIENT PRIVACY-PRESERVING RE-IDENTIFICATION

(71) Applicant: Xerox Corporation, Norwalk, CT (US)

(72) Inventors: Albert Gordo Soldevila, Grenoble (FR); Naila Murray, Grenoble (FR); Florent C. Perronnin, Domène (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/662,939

(22) Filed: Mar. 19, 2015

(65) Prior Publication Data
US 2016/0277190 A1 Sep. 22, 2016

(51) Int. Cl.
*H04L 29/06* (2006.01)
*H04L 9/32* (2006.01)
*G06Q 10/00* (2012.01)

(52) U.S. Cl.
CPC ........... *H04L 9/3231* (2013.01); *G06Q 10/00* (2013.01); *H04L 9/3247* (2013.01)

(58) Field of Classification Search
CPC ...... H04L 9/3231; H04L 9/3247; G06Q 10/00
USPC ........................................................ 713/186
See application file for complete search history.

(56) References Cited

U.S. PATENT DOCUMENTS

| | | | |
|---|---|---|---|
| 7,130,454 B1 * | 10/2006 | Berube | G06K 9/00234 382/118 |
| 7,647,331 B2 | 1/2010 | Li et al. | |
| 7,801,893 B2 | 9/2010 | Gulli' et al. | |
| 8,452,106 B2 | 5/2013 | Ke et al. | |
| 2007/0069921 A1 * | 3/2007 | Sefton | G08G 1/0175 340/932.2 |
| 2008/0166026 A1 * | 7/2008 | Huang | G06K 9/00281 382/118 |

(Continued)

OTHER PUBLICATIONS

Almazán, et al., "Word Spotting and Recognition with Embedded Attributes," IEEE Transaction on Pattern Analysis and Machine Intelligence, pp. 1-17 (2014).

(Continued)

*Primary Examiner* — Amir Mehrmanesh
*Assistant Examiner* — Sakinah Taylor
(74) *Attorney, Agent, or Firm* — Fay Sharpe LLP

(57) ABSTRACT

Authentication methods are disclosed for determining whether a person or object to be authenticated is a member of a set of authorized persons or objects. A query signature is acquired comprising a vector whose elements store values of an ordered set of features for the person or object to be authenticated. The query signature is compared with an aggregate signature comprising a vector whose elements store values of the ordered set of features for the set of authorized persons or objects. The individual signatures for the authorized persons or objects are not stored; only the aggregate signature. It is determined whether the person or object to be authenticated is a member of the set of authorized persons or objects based on the comparison. The comparing may comprise computing an inner product of the query signature and the aggregate signature, with the determining being based on the inner product.

19 Claims, 9 Drawing Sheets

(56) References Cited

U.S. PATENT DOCUMENTS

| | | | |
|---|---|---|---|
| 2009/0058598 A1* | 3/2009 | Sanchez Sanchez | G06F 21/32 340/5.83 |
| 2009/0208059 A1* | 8/2009 | Geva | G06K 9/3258 382/105 |
| 2013/0129151 A1* | 5/2013 | Rodriguez Serrano | G06K 9/6217 382/105 |
| 2014/0072185 A1* | 3/2014 | Dunlap | G06K 9/00288 382/118 |
| 2014/0114987 A1* | 4/2014 | Hoeng | G06N 5/02 707/748 |
| 2014/0155098 A1* | 6/2014 | Markham | H04B 1/0064 455/456.3 |
| 2015/0086118 A1* | 3/2015 | Shabou | G06K 9/6249 382/195 |

OTHER PUBLICATIONS

Chum, et al., "Scalable Near Identical Image and Shot Detection," Proc. 6th ACM International conference on Image and Video Retrieval, pp. 1-8 (2007).

Chum, et al., "Near Duplicate Image Detection: min-Hash and tf-idf Weighting," In BMVC, vol. 810, pp. 812-815 (2008).

D'Angelo, et al., "Beyond Bits: Reconstructing Images from Local Binary Descriptors," 21st International Conference on Pattern Recognition, pp. 935-938 (2012).

Doermann, et al., "The Detection of Duplicates in Document Image Databases," Language and Media Processing Laboratory Institute for Advanced Computer Studies, University of Maryland, pp. 1-37 (1997).

Grauman, et al., "Efficient Image Matching with Distributions of Local Invariant Features," Computer Science and Artificial Intelligence Laboratory, Technical Report, pp. 1-18 (2004).

Kato, et al., "Image Reconstruction from Bag-of-Visual-Words," Computer Vision and Pattern Recognition (CVPR), pp. 955-962 (2014).

Ke, et al., "Efficient Near-duplicate Detection and Sub-image Retrieval," ACM Multimedia, vol. 4, No. 1, pp. 1-8 (2004).

Murray, et al., "Generalized Max Pooling," arXiv preprint arXiv:1406.0312, pp. 1-8 (2014).

Weinzaepfel, et al., "Reconstructing an image from its local descriptors," Computer Vision and Pattern Recognition, pp. 1-8 (2011).

Zhang, et al., "Detecting Image Near-Duplicate by Stochastic Attribute Relational Graph Matching with Learning," Proceedings of the 12th Annual ACM International Conference on Multimedia, ACM, pp. 877-884 (2004).

* cited by examiner

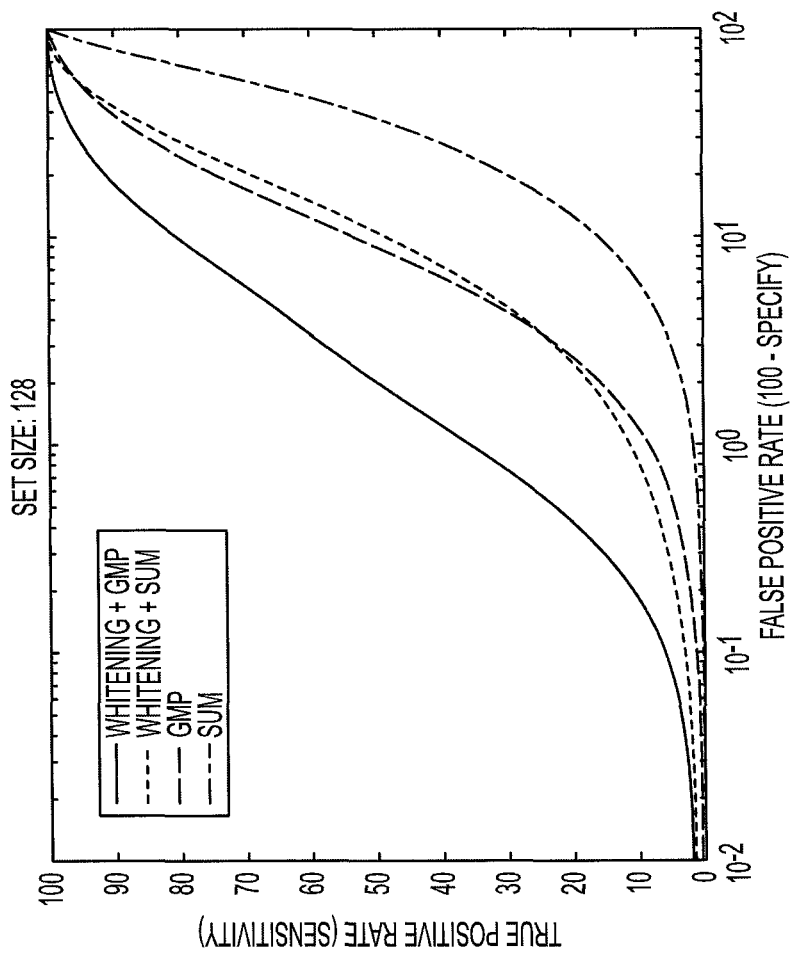

ONE-TO-MANY MATCHING WITH APPLICATION TO EFFICIENT PRIVACY-PRESERVING RE-IDENTIFICATION

BACKGROUND

The following relates to the biometric identification arts, object identification arts, security clearance and admittance arts, one-to-many matching arts, and related arts.

One-to-many matching refers generally to the problem of determining whether a person or object is a member of a defined set of persons or objects. Such matching problems arise in diverse applications relating to security clearance, toll parking, invitation-only events, and the like. For example, a biometric identification system acquires a biometric signature of a "query" person requesting admission to a secure area (or attempting to log onto a computer with biometric identification security, or so forth). The biometric signature may, for example, be a feature vector representation of one or more face images, or of an electronically acquired fingerprint, an of optical eye scan, an of electronically recorded handwritten signature, or so forth. The biometric signature of the query person is compared with stored biometric signatures of all authorized persons. If a match is found, then the query person is admitted (or logged into the computer, or so forth).

As another example, a parking lot may be reserved for only authorized vehicles. Such a situation arises in a pre-pay parking lot serving customers who pay a monthly parking fee, or in the case of an employee-only parking lot, or so forth. In this case, the object signature may suitably be a feature vector derived from an image of the vehicle license plate, which is acquired by a camera at a toll gate. The feature vector is compared with a database of feature vectors representing license plate images of authorized vehicles, and the vehicle is admitted if its plate image feature vector matches the feature vector of any plate image in the database. In a variant approach, an image of the vehicle as a whole, or a portion of the vehicle, may be the source of the feature vector that is used as the signature.

Yet another example of a one-to-many matching system is a credit card scanner, which scans a credit card for its number (its "signature") and compares this signature of the query credit card with all credit card numbers in the database—if no match is found then the card is declined.

One difficulty with one-to-many matching systems is scalability. As the number of authorized persons or objects increases, the size of the database storing the signatures of the authorized persons or objects increases, while processing efficiency degrades. If the number of authorized persons or objects is denoted by N, then the authorized signatures database size, and hence the search time for searching that database, scales with N.

Besides scalability, privacy is another concern with one-to-many matching systems. If the signatures are considered to be sensitive data, then the storage of the authorized signatures in the signatures database presents a possible security issue. Signatures such as fingerprints, credit card numbers, and so forth are generally considered to be sensitive data.

One way to address both scalability and privacy concerns is to employ a less informative signature. For example, a feature vector can be made smaller, with fewer features extracted from the image, so that a smaller signature can be stored. Privacy is enhanced by the reduced information contained in this smaller signature, but search time continues to scale with N. Moreover, the amount of information contained in the stored signature cannot be reduced too much by this technique, as removal of too much information makes the signature ineffective for unambiguously identifying the authorized person or object.

Disclosed in the following are improved data mining techniques that provide various benefits as disclosed herein.

BRIEF DESCRIPTION

In some embodiments disclosed herein, an authentication system is disclosed, including an authenticator comprising an electronic data processing device configured to perform an authentication process to determine whether a person or object to be authenticated is a member of a set of authorized persons or objects. The authentication process includes the operations of: acquiring a query signature comprising a vector whose elements store values of an ordered set of features for the person or object to be authenticated; computing an inner product of the query signature and an aggregate signature comprising a vector whose elements store values of the ordered set of features for the set of authorized persons or objects; and determining whether the person or object to be authenticated is a member of the set of authorized persons or objects based on the inner product of the query signature and the aggregate signature.

The authentication system of the preceding paragraph may further include an authenticator training component comprising an electronic data processing device configured to generate the aggregate signature representing the set of authorized persons or objects by operations including: generating a set of authorized signatures by acquiring a signature for each authorized person or object comprising a vector whose elements store values of the ordered set of features for that authorized person or object; and determining the aggregate signature to set an inner product of each authorized signature and the aggregate signature to a target inner product value.

In some embodiments disclosed herein, an authentication method is disclosed for determining whether a person or object to be authenticated is a member of a set of authorized persons or objects. The authentication method comprises: acquiring a query signature comprising a vector whose elements store values of an ordered set of features for the person or object to be authenticated; comparing the query signature and an aggregate signature comprising a vector whose elements store values of the ordered set of features for the set of authorized persons or objects; and determining whether the person or object to be authenticated is a member of the set of authorized persons or objects based on the comparison. The comparing operation may comprise computing an inner product of the query signature and the aggregate signature, with the determining being based on the inner product.

In some embodiments disclosed herein, a non-transitory storage medium stores instructions readable and executable by an electronic data processing device to perform an authentication method to determine whether a person or object to be authenticated is a member of a set of authorized persons or objects. The authentication method comprises: operating a camera or biometric sensor to acquire data on the person or object to be authenticated; extracting from the acquired data a query signature comprising a vector whose elements store values of an ordered set of features for the person or object to be authenticated; computing an inner product of the query signature and an aggregate signature comprising a vector whose elements store values of the ordered set of features for the set of authorized persons or objects; and determining whether the person or object to be authenticated is a member of the set of authorized persons or objects based on the inner product of the query signature and the aggregate signature.

BRIEF DESCRIPTION OF THE DRAWINGS

FIGS. 5-10 present experimental results as described herein.

DETAILED DESCRIPTION

The term "signature" as used herein denotes a representation of a person or object, in which the signature comprises values of an ordered set of features, which may be suitably represented as a vector in which each vector element stores the value of a corresponding feature of the ordered set of features. For example, the signature may be image features of an image of a salient aspect of the person or object (for example, a portrait image of a person's face, or a license plate image of the license plate of a vehicle), or the values of the sixteen digits of a sixteen-digit credit card number of a credit card for a credit card object, or values of quantitative features of an electronically recorded human fingerprint, or so forth.

The term "authentication" as used herein denotes the operation of determining whether the signature of a (query) person or object can be matched with any signature in a set of signatures representing a set of authorized persons or objects.

Disclosed herein are authentication systems that operate by aggregating the signatures of a set of authorized persons or objects into a single signature, referred to herein as an "aggregate signature". In illustrative approaches the aggregate signature is constructed using linear aggregations, and the generation of the aggregate signature entails learning an optimal set of weights. During the authentication phase, similarity of the signature of a query person or object with the aggregate signature is suitably computed with a single dot product (i.e. inner product) between the query signature and the aggregate signature. The use of an aggregate signature provides benefits including: reduced storage (only one signature is stored to represent the entire set of authorized persons or objects); efficiency of the authentication system (assessing the query signature reduces to computing a single dot product); and privacy (signatures of individual authorized persons or objects are not stored independently at the authentication system; rather only the aggregate signature need be stored at the authentication system).

Two illustrative approaches are disclosed for learning weights of the aggregate signature: (1) a non-discriminative approach based on Generalized Max Pooling (see Murray and Perronnin, "Generalized Max Pooling" in CVPR (2014); and (2) a discriminative approach based on minimizing the training empirical loss on a classification task. In a variant embodiment, as both approaches are complementary they can be combined to yield improved results.

Figure 1:
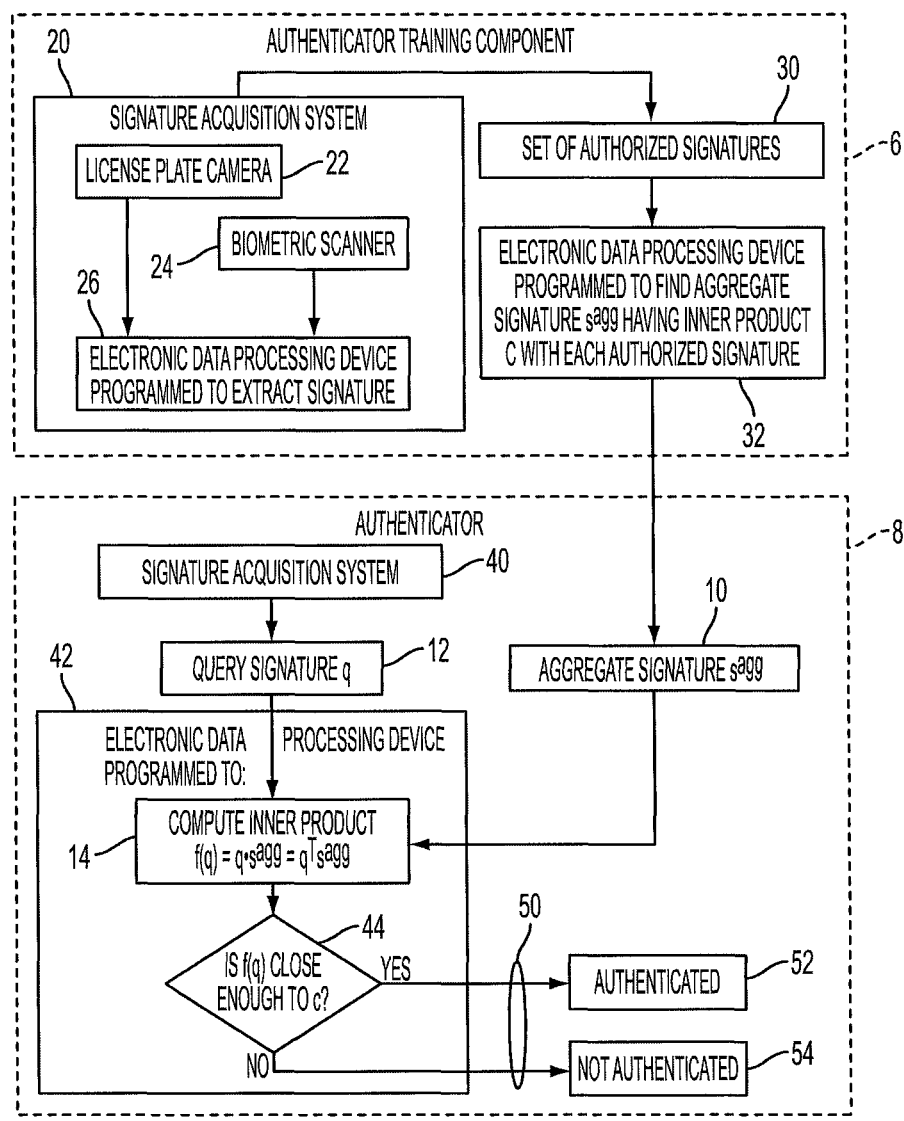
FIG. 1 diagrammatically illustrates an authentication system for determining whether a person or object to be authenticated is a member of a set of authorized persons or objects.

With reference to FIG. 1, an authentication system for determining whether a person or object to be authenticated is a member of a set of authorized persons or objects is diagrammatically illustrated. The authentication system includes an authenticator training component 6 and an authenticator component 8. The authenticator training component 6 generates an aggregate signature 10, also denoted herein as $s^{agg}$, which comprises a vector whose elements store values of the ordered set of features for a set of authorized persons or objects. The aggregate signature 10 is communicated to and stored at the authenticator 8, which then compares a query signature 12, also denoted herein as q, with the aggregate signature 10 in order assess whether the person or object represented by the query signature 12 is a member of the set of authorized persons or objects represented by the aggregate signature 10. In the illustrative embodiment, this comparison entails the operation 14 of computing a dot product (also known as an inner product) between the signature vectors q and $s^{agg}$. This dot product is denoted herein as $f(q)=q \cdot s^{agg}=q^T s^{agg}$ where the superscript T denotes the matrix (or vector) transposition operator.

With continuing reference to FIG. 1, the authentication training component 6 includes a signature acquisition system 20 that generates a signature for each authorized person or object. As one illustrative example, suitable when the set of authorized persons or objects is a set of authorized vehicles, the acquisition system 20 may include a license plate camera 22 arranged to acquire an image of the license plate of an authorized vehicle. As another illustrative example, suitable when the set of authorized persons or objects is a set of authorized persons, the acquisition system 20 may include a biometric sensor 24 (e.g. an electronic fingerprint sensor, or an optical eye scanner, or a camera arranged to acquire a portrait image of an authorized person's face, or so forth). The data on the authorized person or object produced by the camera 22, biometric sensor 24, or other data acquisition component is input to a computer or other electronic data processing device 26 that is programmed to compute values of the ordered set of features making up the signature. For example, in vehicle identification the electronic data processing device 26 is programmed to process a license plate image using image processing techniques to extract image features that are distinctive, that is, which are effective to distinguish one license plate from another. In a variant embodiment for license plates, the electronic data processing device 26 is programmed to perform image processing comprising optical character recognition (OCR) on the license plate image in order to read the license plate number from the image, and is further programmed to construct the signature as the letters and/or digits of the license plate number, optionally along with other features such as a state or province identification derived from the license plate image. In the case of a biometric signature, the electronic data processing device 26 is programmed to process the electronic fingerprint, eye scan, portrait image, or so forth to derive biometric features known to vary amongst different individuals and hence useful in constructing an ordered set of biometric features forming the biometric signature for the authorized person.

The signature acquisition system 20 is applied to generate an authorized signature for each authorized person or object of the set of authorized persons or objects. These authorized signatures then form a set of authorized signatures 30. In a conventional authentication approach, this set of authorized signatures 30 would be used directly to authenticate a (query) person or object, by comparing the (query) signature of the query person or object against each authorized signature—if any match is found, the query person or object is deemed authenticated; otherwise, the query person or object is deemed not authenticated. As already discussed, this approach has some disadvantages. It requires sufficient data storage to store the entire set of authorized signatures 30. Extensive authentication processing is required as each authorized signature must be compared individually until a match is found, or until all authorized signatures have been compared and it is concluded the query signature is not authorized. Still further, storage of the set of authorized signatures 30 presents a possible privacy or data security issue if the signatures are considered to be personal information or sensitive data.

In embodiments disclosed herein, the set of authorized signatures 30 is aggregated by the authenticator training component 6 in order to generate the aggregate signature 10, which is then used for subsequent authentication operations performed by the authenticator 8. This alleviates the aforementioned disadvantages: storage requirements are reduced as only the single aggregate signature 10 is stored at the authenticator 8; processing time is vastly reduced as only a single signature comparison is performed; and privacy concerns are alleviated because the aggregate signature 10 is not uniquely associated with any particular authorized person or object. More particularly, in the illustrative embodiment of FIG. 1 a computer or other electronic data processing device 32 is programmed to find the aggregate signature having an inner product (i.e. dot product) of value c with each authorized signature of the set of authorized signatures 30. In other words, the aggregate signature $s^{agg}$ 10 generated by the electronic data processing device 32 satisfies (within some tolerance, or to the extent achievable by an optimization routine) the condition $s^{agg} \cdot s^{auth} = c$ for all authorized signatures $s^{auth}$ in the set of authorized signatures 30.

As diagrammatically indicated in FIG. 1, the aggregate signature $s^{agg}$ 10 generated by the electronic data processing device 32 is communicated to the authenticator 8. This may be done by various electronic mechanisms, e.g. via an encrypted secure Internet connection (e.g. employing SSL, TLS, or so forth), or a dedicated secure communication link, or so forth, or may be done manually, e.g. by having the aggregate signature 10 copied to a thumb drive and manually transported to the authenticator 8. At the authenticator 8, the aggregate signature 10 is used in authentication tasks. A person or object to be authenticated (referred to herein as a "query" person or object) is processed by a signature acquisition system 40 to generate the query signature 12 for the person or object to be authenticated. In order to make a "fair comparison" with the aggregate signature 10, the signature acquisition system 40 that generates the query signature 12 should produce the query signature 12 in the same format as that of the set of authorized signatures 30. In other words, the signature acquisition system 40 should be functionally equivalent to the signature acquisition system 20. To this end, the data acquisition component of the signature acquisition system 40 should be functionally equivalent to the data acquisition component 22, 24 of the system 20, and a computer or other electronic data processing device of the signature acquisition system 40 should produce the same signature format as the electronic data processing device 26 of the system 20 (i.e., a signature of the same vector size, with vector elements storing values for the same ordered set of features). In some embodiments, it is contemplated for the two signature acquisition systems 20, 40 to be the same physical system, first being used to generate the authorized signatures and thereafter being used to generate signatures for query persons or objects.

The generated query signature 12 is then compared with the aggregate signature 10 using a suitably programmed electronic data processing device 42. In illustrative FIG. 1, performing the comparison includes performing the operation 14 of computing a dot product (i.e. inner product) between the query signature 12 and the aggregate signature 10, that is, computing $f(q) = q \cdot s^{agg} = q^T s^{agg}$. In an operation 44, this inner product $f(q)$ is compared with the constant c to generate an authentication output 50. As previously described with reference to operation of the training electronic data processing device 32, the aggregate signature 10 was optimized such that $s^{agg} \cdot s^{auth} = c$ for all authorized signatures $s^{auth}$ in the set of authorized signatures 30. As disclosed herein, it follows that if $f(q) = q \cdot s^{agg}$ is close to the constant c then it is concluded that the query signature q belongs to the set of authorized signatures 30, so that the authentication output 50 is an indication 52 that the query person or object is authenticated. On the other hand, if $f(q) = q \cdot s^{agg}$ is not close to the constant c then it is concluded that the query signature q does not belong to the set of authorized signatures 30, and the authentication output 50 is set to an indication 54 that the query person or object is not authenticated.

Figure 2:
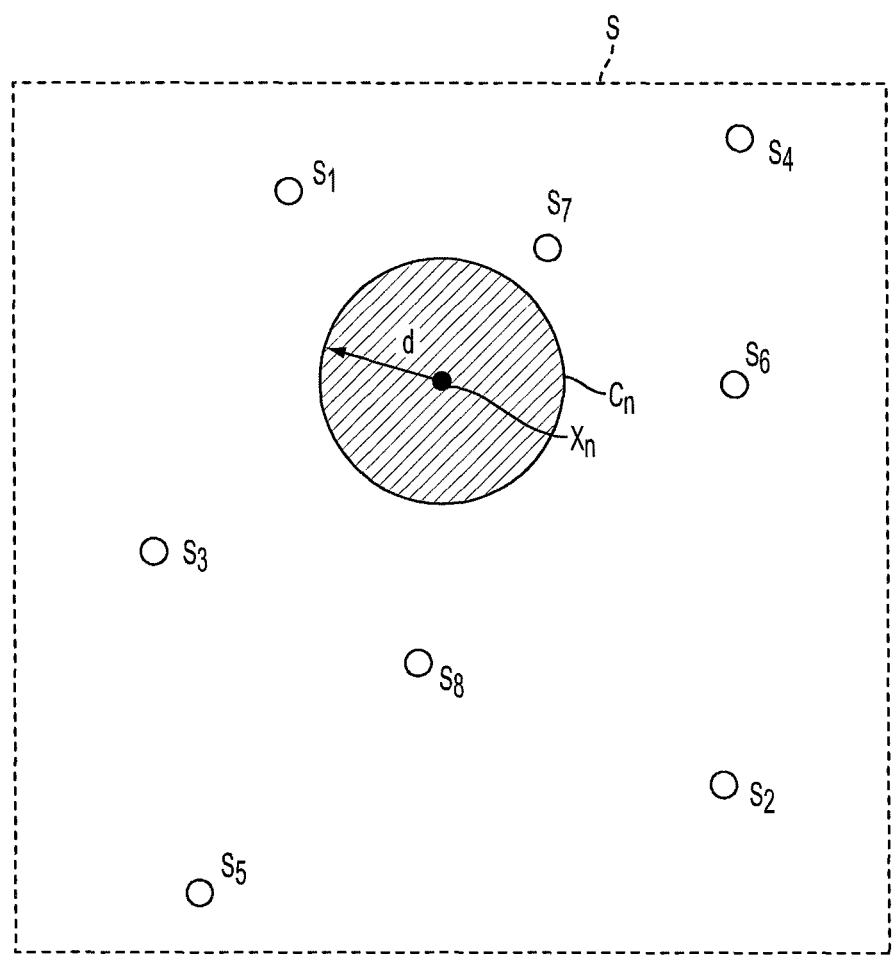
FIG. 2 diagrammatically illustrates a comparison of the authentication process performed by the system of FIG. 1 compared with a classification process.

With reference to FIG. 2, the disclosed approach for performing authentication using an aggregate signature $s^{agg}$ has some apparent similarities with classification. For example, in centroid-based classification or clustering, a class may be defined with respect to a centroid located in the feature space. In diagrammatic FIG. 2, a feature space S includes such a centroid $X_n$. (Note that to enable visualization the feature space S of diagrammatic FIG. 2 is two-dimensional, i.e. defined by two features—however, in many practical applications the feature space is many-dimensional, e.g. defined by a set of several features, or several dozen features, or so forth). In the case of classification, a feature vector belongs to the class n defined with respect to centroid $X_n$ if it is sufficiently "close to" the centroid $X_n$. This is diagrammatically shown in FIG. 2 as a class region $C_n$ containing all feature vectors within a distance d of the centroid $X_n$. The rationale for such a class definition is that the feature vectors within the class region $C_n$ are expected to be similar to one another since the values of their constituent features, as represented by their feature vectors, are similar.

The authentication task is, however, not a classification problem. Rather, the authentication task entails identifying whether a query feature vector (i.e. signature) of a query person or object matches any authorized signature of a set of authorized signatures. In FIG. 2, a diagrammatic set of eight authorized signatures is represented by eight discrete feature vectors $\{S_1, S_2, S_3, S_4, S_5, S_6, S_7, S_8\}$. It will be particularly noticed that these eight feature vectors $S_1, \ldots, S_8$ are not (in general) located close to one another in the feature space. This is typical of many authentication tasks, for which the authorized signatures are unlikely to exhibit strong correlations, much less cluster into a specific region of the feature space. For example, license plate images may be used to identify authorized vehicles—but there is no reason to expect the license plates of authorized vehicles to be similar to one another. This is because the authorized vehicles are usually not selected based on their license plates, but rather based on some characteristics not related to license plates (e.g. based on the vehicle belonging to an employee who parks in the employees-only parking lot). Likewise, in a biometric authentication system context, the set of authorized persons is usually not chosen based on similarity of their biometric signatures (e.g. similar fingerprints, or similar facial features) but rather based on some unrelated criteria (e.g. having a certain security clearance, or being employees of the company, or so forth).

There is therefore no reason, in general, to expect that the set of authorized signatures of an authentication task will fall within a simply connected region analogous to illustrative class region $C_n$ of a classification problem, and more generally it is not apparent that a single vector in the feature space might be useful in performing authentication (or, more generally, one-to-many matching) entailing matching of a query signature (or, more generally, query feature vector) with one of a set of authorized signatures (more generally, a set of feature vectors any one of which is to be matched in the one-to-many matching problem) that are widely distributed through the feature space.

Figure 3:
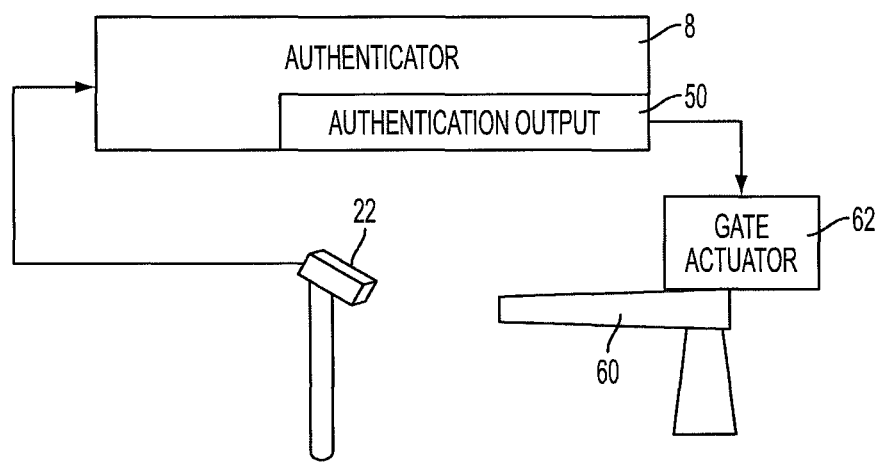
FIG. 3 diagrammatically illustrates a camera-based vehicle barrier suitably employing the authentication system of FIG. 1.
Figure 4:
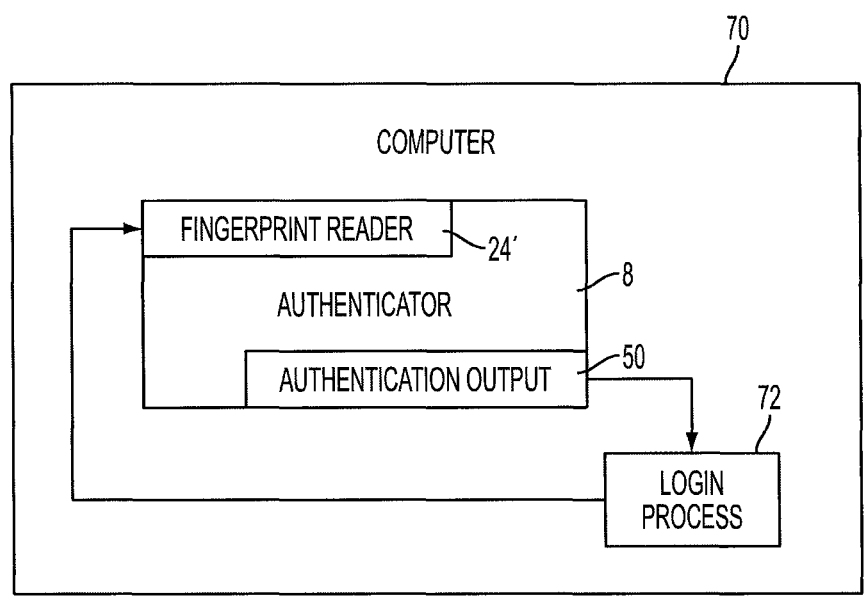
FIG. 4 diagrammatically illustrates a computer with a biometric (electronic fingerprint)-based login process that suitably employs the authentication system of FIG. 1.
Figure 5:
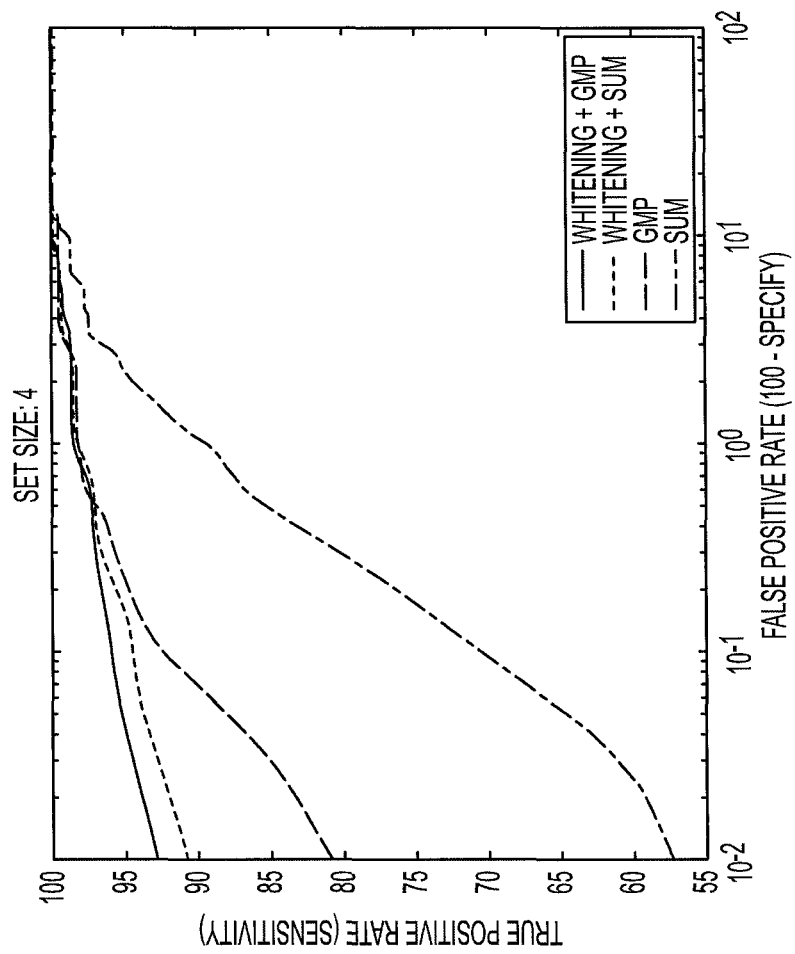
Figure 6:
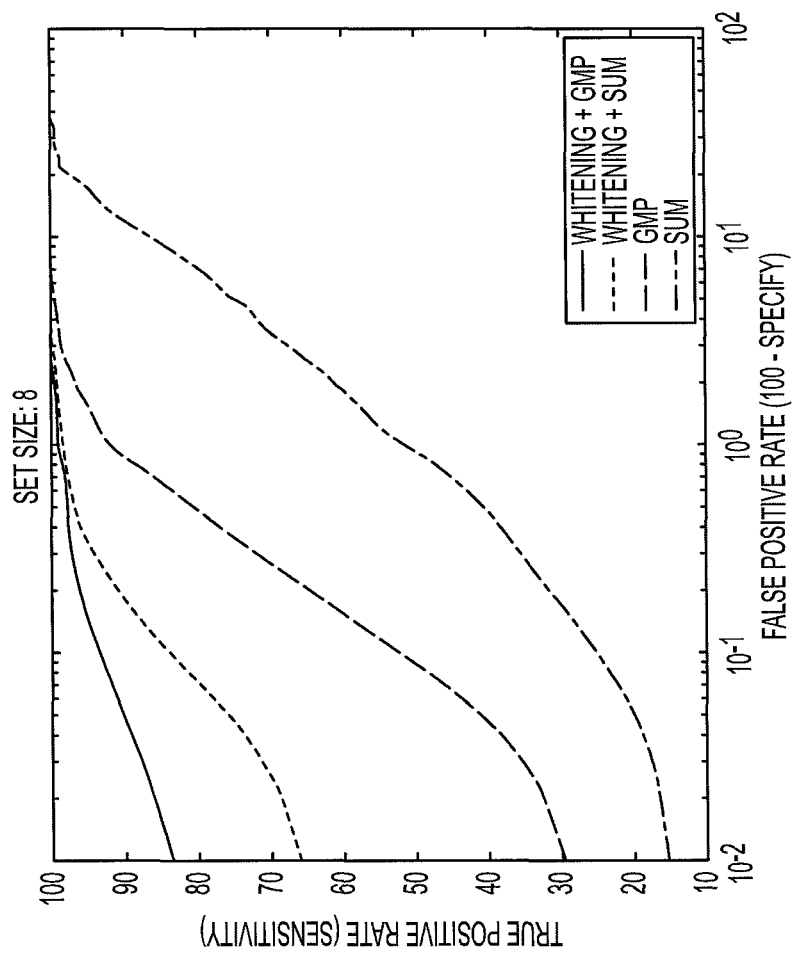
Figure 7:
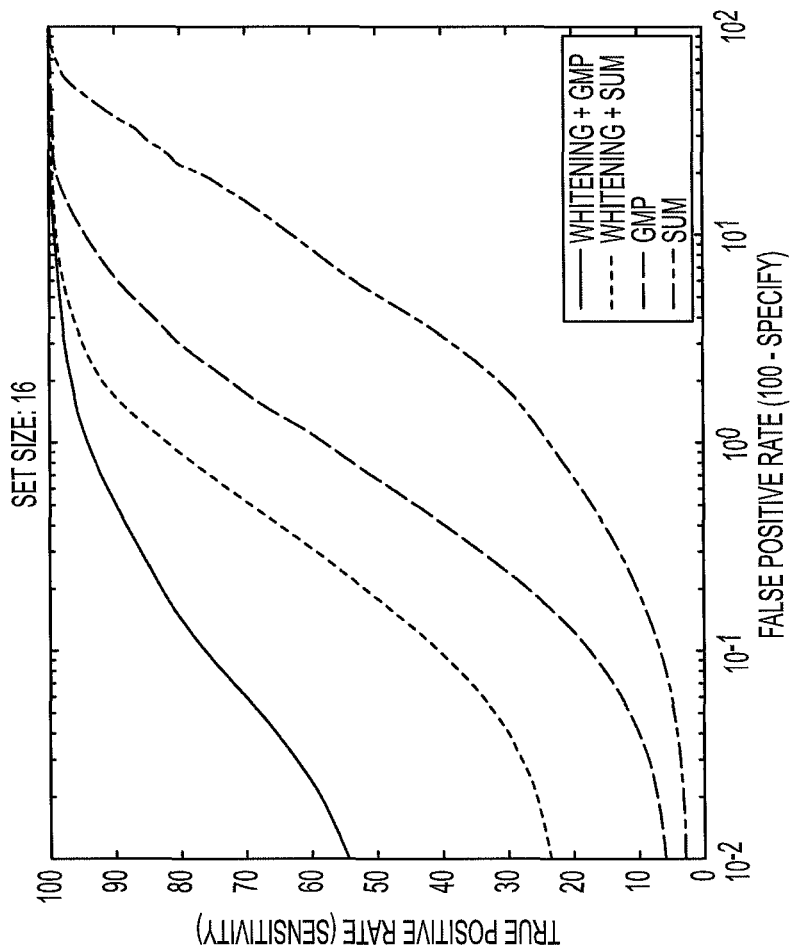
Figure 8:
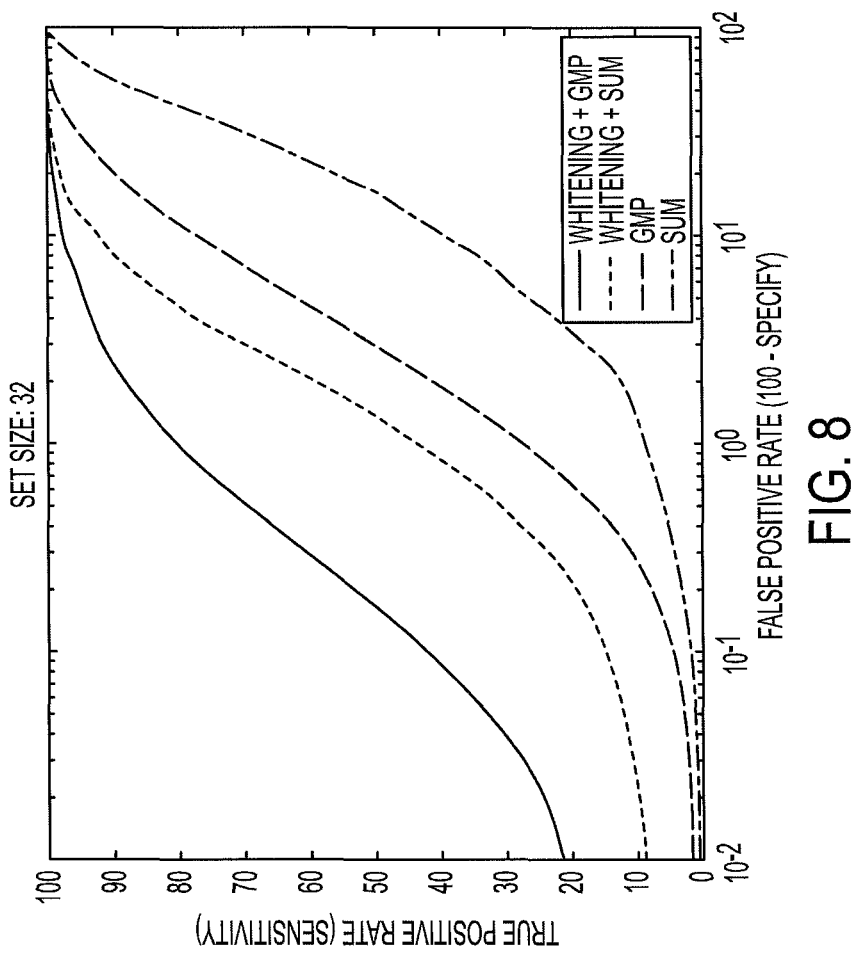
Figure 9:
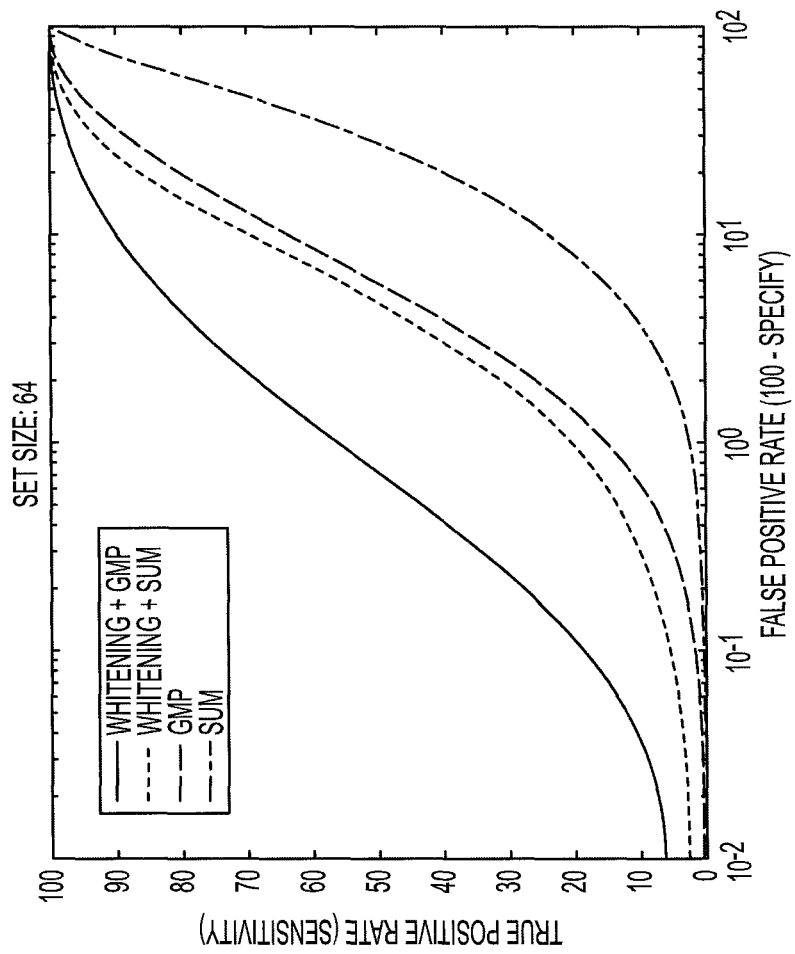

With reference to FIGS. 3 and 4, two illustrative authentication tasks are described, in which the authentication system of FIG. 1 may be usefully employed. These are merely illustrative examples. In FIG. 3, a vehicle barrier is illustrated, including a license plate camera 22 arranged at the approach to a vehicle barrier gate 60 and positioned to acquire the image of a license plate of an approaching or stopped vehicle. The license plate image is input to the authenticator 8 of FIG. 1, which generates the authentication output 50 (either an "authenticated" indication 52 or a "not authenticated" indication 54) which serves as input to a gate actuator 62. The gate actuator 62 has a default "gate closed" actuation signal: it sends a "gate open" actuation signal to the vehicle barrier gate 60 if the authentication output 50 indicates the vehicle is authenticated, or maintains the "gate closed" actuation signal if the authentication output 50 indicates the vehicle is not authenticated.

In the example of FIG. 4, the authenticator 8 of FIG. 1 is used in a log-in process for a computer 70 (e.g. a notebook computer, tablet or slate computer, or so forth). In this case the biometric scanner 24 shown in illustrative FIG. 1 is suitably employed as the data acquisition component, for example in the form of an illustrative electronic fingerprint reader 24' built into the computer 70. Based on the acquired fingerprint, the authenticator 8 generates a biometric (fingerprint-based) query signature corresponding to the person attempting to log into the computer 70. To this end, a log-in process executing on the computer 70 suitably detects the (query) user placing his or her finger over the fingerprint reader 24', and invokes the authenticator 8 to read the fingerprint, generate the query signature 12, and compare it with the aggregate signature 10 as described with reference to FIG. 1. If the authentication output 50 indicates the person is authenticated, then the log-in process 72 proceeds with the user log-in. On the other hand, if the authentication output 50 indicates the person is not authenticated, then the log-in process 72 does not proceed with the user log-in.

The various electronic data processing devices 26, 32, 42 of the authentication system of FIG. 1 may be variously combined or otherwise variously embodied depending upon the specific application. While the authentication training component 6 and the authenticator 8 are shown as separate components in FIG. 1, these may optionally be combined, in which case the various electronic data processing devices 26, 32, 42 may be embodied as a single computer or other single electronic data processing device programmed to perform the described functions. On the other hand, the various electronic data processing devices 26, 32, 42 may be separate components as illustrated in FIG. 1.

By way of further illustration, in the case of the vehicle access control system of FIG. 3, it may be convenient to have the authentication training system be implemented at a central location with a single computer embodying the electronic data processing devices 26, 32. Any vehicle that is to be authorized would then be driven to this central station to be imaged by a camera at that location to generate its authorized signature. In this case, numerous instances of the access system of FIG. 3 may be implemented, one at each access road leading into a secure facility and with a computer embodying an instance of the electronic data processing device 42, with the same aggregate signature 10 loaded into each.

In the case of the computer log-in system of FIG. 4, all of the electronic data processing devices 26, 32, 42 may be suitably implemented on the single (possibly multi-core) processor or CPU of the computer 70. In a variant embodiment, the fingerprint reader 24' may be provided as a commercially available component with the electronic data processing devices 26 embodied as a microprocessor of the fingerprint reader 24' separate from the CPU of the computer 70.

The disclosed authentication techniques may also be embodied as a non-transitory storage medium storing instructions executable by one or more computers and/or other electronic data processing device(s) 26, 32, 42 to perform the disclosed data processing operations in conjunction with data acquisition components 22, 24. The non-transitory storage medium may, for example, be a hard disk or other magnetic storage medium, or a FLASH memory or other electronic storage medium, or an optical disk or other optical storage medium, various combinations thereof, or so forth.

In the following, some more specific embodiments are described as non-limiting illustrative examples. The following notation is used in these examples. The number of authorized signatures in the set of authorized signatures 30 is denoted as K, and the set $\mathcal{S}$ of authorized signatures 30 is written as $\mathcal{S} = \{s_1, s_2, \ldots, s_K\}$. Given a query feature vector $q \in \mathbb{R}^d$ extracted from the query image (or from biometric data, or so forth) corresponding to the query signature 12 of FIG. 1, and given the set of K feature vectors $\mathcal{S} = \{s_1, s_2, \ldots, s_K\}$ corresponding to the set of authorized signatures 30 of FIG. 1, it is desired to learn a function F: $\mathbb{R}^d \to \{0,1\}$ that predicts whether the query q is relevant to (i.e. a member of) the set $\mathcal{S}$ or not. Note that F will not have access to the original set $\mathcal{S}$ after it has been learned.

A function F is defined through the composition of two functions: a real-valued function $f: \mathbb{R}^d \to \mathbb{R}$ and a quantizing function $\sigma: \mathbb{R} \to \{0,1\}$, such as that $F(q) = (\sigma \circ f)(q) = \sigma(f(q))$. Function $f$ gives a measure of similarity or distance between the query signature q and the set of authorized signatures $\mathcal{S}$, while function $\sigma$ transforms that measure into a final decision, usually through a thresholding. In illustrative FIG. 1, the function $f$ is performed in the operation 14, while the function $\sigma$ is performed in the decision operation 44. Optimizing F directly is usually NP-hard due to the quantization. To address this, the problem is relaxed as follows: instead of optimizing F directly, the real-valued function $f$ is optimized alone, and the thresholding function $\sigma$ is applied afterwards to the optimized function $f$.

In the following, two different approaches are disclosed that define and optimize an $f$ function. The first one is a non-discriminative approach based on Generalized Max Pooling. The second one is a discriminative approach based on minimizing the empirical loss on the training set. Both approaches can be complementary, and an approach for using them together is also disclosed.

The generalized max pooling approach is based on the following idea: it is desired for the dot-product similarity between a single signature in the set and the aggregate signature to return a constant value c. Given a new (unknown, i.e. query) signature, if its dot-product with the aggregate signature is close to c, then this indicates the signature belongs to the set (i.e. should be authorized). However, if the dot-product is significantly different from c, then the signature likely does not belong to the set (i.e., should not be authorized). Such a solution is more likely to produce false-positives than false negatives.

The Generalized Max Pooling (GMP) approach computes a set representation $s^{gmp}$ to which each member of the set is equally similar (where similarity is measured by the dot product), that is:

$$s_n^T s^{gmp} = c, \text{ for } n=1,\ldots,K \quad (1)$$

The set representation $s^{gmp}$ suitably corresponds to the aggregate signature 10, elsewhere denoted herein as $s^{agg}$. The choice of the constant c is arbitrary, and may be conveniently set to unity (1). With c=1 Expression (1) may be written in matrix form as:

$$S^T s^{gmp} = 1_K \quad (2)$$

where S represents the matrix of column vectors $s_i$ and $1_K$ denotes the K-dimensional vector of all ones. Expression (2) is a linear system of K equations with D unknowns. In general, this system might not have a solution (e.g. when D<K) or might have an infinite number of solutions (e.g. when D>K). To accommodate this, Expression (2) can be recast as a least-squares regression problem and solved according to:

$$s^{gmp} = \operatorname*{argmin}_{s} \frac{1}{2} \|S^T s - 1_K\|_2^2 \quad (3)$$

It is beneficial to add a regularization term to obtain a stable solution. Introducing $s_\lambda^{gmp}$, the regularized GMP becomes:

$$s_\lambda^{gmp} = \operatorname*{argmin}_{s} \frac{1}{2} \|S^T s - 1_K\|^2 + \lambda \frac{1}{2} \|s\|_2^2 \quad (4)$$

This is a ridge regression problem whose solution is:

$$s_\lambda^{gmp} = (SS^T + \lambda I)^{-1} S 1_K \quad (5)$$

where I in Expression (5) is the identity matrix. The regularization parameter $\lambda$ should be cross-validated. By construction, the similarity between any $s_i$ and $s_\lambda^{gmp}$ is approximately equal to 1. Therefore, set membership is suitably determined by defining $f(q) = q \cdot s_\lambda^{gmp} = q^T s_\lambda^{gmp}$, and the thresholding function $\sigma$ is suitably:

$$\sigma(f(q)) = \begin{cases} 1, & \text{if } |f(q) - 1| < \tau \\ 0, & \text{otherwise} \end{cases} \quad (6)$$

In this case, the decision as to whether query signature q belongs with the set of authorized signatures $\mathcal{S}$, i.e. is authenticated, is expressed as a thresholding operation, as per Expression (6). Varying the threshold $\tau$ controls the ratio between the true positive rate and the false positive rate.

The GMP in this context may be considered as a weighted linear aggregation. The regularized GMP $s_\lambda^{gmp}$ is the solution to Expression (4). Consequently, according to the representer theorem, $s_\lambda^{gmp}$ can be written as a linear combination of the encodings: $s_\lambda^{gmp} = \sum_{i=1}^{K} \alpha_i s_i = S\alpha_\lambda$, where $\alpha_\lambda$ is the vector of weights. Therefore GMP can be viewed as an instance of weighted aggregation. By introducing $s = S\alpha$ in the GMP objective of Expression (4):

$$\alpha_\lambda = \operatorname*{argmin}_{\alpha} \frac{1}{2} \|S^T S \alpha - 1_K\|_2^2 + \lambda \frac{1}{2} \|S\alpha\|_2^2 \quad (7)$$

Denoting by $\mathcal{K} = S^T S$ the K×K Gram matrix of vector-to-vector similarities, the following is obtained:

$$\alpha_\lambda = \operatorname*{argmin}_{\alpha} \|\mathcal{K}\alpha - 1_K\|^2 + \lambda \alpha^T \mathcal{K} \alpha \quad (8)$$

which admits the solution $\alpha_\lambda = (\mathcal{K} + \lambda I_K)^{-1} 1_K$.

Note that for $\lambda$ very large we have $\alpha_\lambda \approx 1_K/\lambda$, i.e. equal weights for all $s_i$, resulting in standard sum aggregation. (As the constant factor c is arbitrarily set to 1 in Equation (1), the set of equal weights $1_K/\lambda$ can also be arbitrarily set to $1_K$, as for sum aggregation). Note also that, if the set of signatures $\mathcal{S}$ forms an orthonormal basis, i.e $\mathcal{K} = I_K$, then again we are back to standard sum aggregation. In view of this, in experiments reported herein the disclosed approach is compared to the sum-aggregation baseline.

As another illustrative example, the use of empirical loss minimization for learning $f$ is described. By way of motivation, it is noted that the GMP approach has two potential shortcomings. First, it entails computing the GMP weights for each set, and if the set changes (for example one adds or removes elements), the GMP weights need to be recomputed from scratch using the individual signatures. Second, the weights are learned using only the elements on the set. Although this can be convenient because no extra learning data is needed, if such extra negative data were available the method would not exploit it: GMP does not ensure that elements that do not belong to the set are not given scores close to 1 (in this example where c=1 is chosen; more generally, close to c where the choice of the constant c is arbitrary).

The illustrative empirical loss minimization approach to learn $f$ leverages extra training data and facilitates modifying the set contents. Assume availability of N training samples, $X \in \mathbb{R}^{d \times N}$, where $x_i$ is the i-th training sample. In general, X contains both the target samples contained in $\mathcal{S}$ as well as a set of negative samples not contained in $\mathcal{S}$. The samples that form the target set are labeled with y=1, while the remaining samples are labeled with y=0. The labels are collected into a vector $Y \in \{0,1\}^N$ and with $y_i$ the i-th label.

In general, we are interested in finding an $f^*$ that minimizes the training empirical loss:

$$f^* = \operatorname*{argmin}_{f} \frac{1}{2} \sum_{i=1}^{N} l(f(x_i), y_i) + \lambda \Omega(f) \quad (9)$$

where $\Omega$ is a regularization function and $\lambda$ controls its weight. In what follows, we consider a linear function $f$ parameterized with vector w, i.e, $f(q;w) = q^T w$. In the case where $\Omega(f)=g(\|f\|)$ with $g:[0,\infty)\to\mathbb{R}$ is strictly monotonically increasing, according to the representer theorem, it is known that w is a linear combination of the training samples $x_i$.

In what follows, we focus on the case of the square (i.e. quadratic) loss because it leads to an efficient closed form formula:

$$l(f(x_i),y_i)=l(x_i^T w,y_i)=(x_i^T w-y_i)^2 \quad (10)$$

If we consider an $l_2$ regularizer over w, Expression (9) is rewritten in matrix form as:

$$\operatorname*{argmin}_w \frac{1}{2}\|X^T w - Y\|_2^2 + \lambda\frac{\|w\|_2^2}{2} \quad (11)$$

This is a ridge regression problem and w has a closed form solution:

$$w=(XX^T+\lambda I)^{-1}XY \quad (12)$$

This has similarities with the solution of the GMP problem, although they emerge from optimizing two different problems.

In Expression (12), the matrix w now consists of a label-independent part $(XX^T+\lambda I)^{-1}$ and a label-dependent part XY. The first part, $(XX^T+\lambda I)^{-1}$, does not require the labels of the data. In fact, it can be approximated with an "external" dataset of unlabeled signatures, with no need for set labels indicating whether or not the signatures are in the set of authorized signatures 30. It can then be reused when modifying the sets. This means that one only needs to know at training time the set of "positive" signatures, that is, the set of authorized signatures 30. The second part, XY, is simply the sum of the elements that form the set $\mathcal{S}$:

$$XY = \sum_{i=1}^{N} y_i x_i = \sum_{s \in \mathcal{S}} s \quad (13)$$

Therefore updating the aggregated signature when adding or removing authorized signatures of the set $\mathcal{S}$ is straightforward.

In the quadratic loss context, whitening can also be advantageously employed. Denote by U the column eigenvectors and by D the diagonal matrix of eigenvalues of the eigendecomposition of $XX^T+\lambda I$. This means that we have $XX^T+\lambda I=UDU^T$ which amounts to a Singular Value Decomposition (SVD) analysis. Then w can be further rewritten as:

$$w = UD^{-1}U^T\left(\sum_{i=1}^{N} y_i x_i\right) \quad (14)$$

The similarity between a query q and a set $\mathcal{S}$ using the learned w can be computed as:

$$q^T w = q^T UD^{-1}U^T \sum_{i=1}^{N} y_i x_i \quad (15)$$

Introducing $\hat{U}=(D^{-1/2}U)^T$, we have:

$$q^T w = [\hat{U}q]^T \left[\sum_{i=1}^{N} y_i \hat{U} x_i\right] \quad (16)$$

Therefore, the similarity between a query signature q and the set of authorized signatures $\mathcal{S}$ can be seen as the dot product between the query and the sum-aggregated signatures in the set after being projected in a space generated by the whitened eigenvectors of the data. In practice, the matrices U and D are suitably learned from the data and all the signatures with $\hat{U}=(UD^{-1/2})^T$ are projected. Then, the similarity between a query and the set of authorized signatures is computed as the dot product of the whitened query and the sum-aggregated whitened set. In experiments, it was observed that $l_2$-normalizing the signatures after projecting them with $\hat{U}$ significantly improved the accuracy. Finally, the quantization function σ in this case is suitably a simple thresholding, i.e, $\sigma(q^T w)=1$ if $q^T w > \tau$ and 0 otherwise. In this case the decision as to whether query signature q belongs with the set of authorized signatures $\mathcal{S}$, i.e. is authenticated, is based on whether the similarity measure (inner product $q^T w$) exceeds a threshold τ.

The whitening can be viewed as a pre-processing of the data that improves sum-aggregation. This insight enables combination of whitening with GMP as follows: first the data is whitening by projecting on $\hat{U}$, then GMP is applied to the whitened data.

The disclosed approach can be expanded to multiple modalities. For example, in a single-modality approach we are interested in testing if an image of a license plate is in the set of authorized license plates. However, suppose that the authorized license plates set is not formed by images but by text strings. Multi-query frameworks can be used to put images and text in the same subspace, enabling this type of multimodal matching. However, since the statistics of the embedded images and the embedded text are still slightly different, it is likely that learning the whitening on only one of the modalities and applying it to the other may not yield the best results. For this case learning the whitening with a CCA-like formulation may be more fruitful.

Another consideration pertains to the size of the set of authorized signatures 30. As discussed with reference to FIG. 2, the disclosed approach amounts to matching the query signature with a set of authorized signatures that are generally uncorrelated in the feature space. Intuitively, this approach can be expected to be less effective as the size of the set of authorized signatures increases, and indeed experiments indicated performance of the authorization system degrades as the size of the set of authorized signatures increases.

A way to address this is to break the set of signatures 30 into multiple sub-sets, i.e. multiple groups. Since this is a one-to-many matching problem, a query signature is then deemed as authorized if it matches any one of these sub-sets or groups of signatures. Each sub-set or group of authorized signatures is processed separately by the authenticator training component 6 to generate a corresponding aggregate signature 10. In the authenticator 8, processor 42 is separately applied to the query signature 12 for each of the aggregate signatures, and if any of these produce an output 50 indicating authentication 52 then the query signature 12 is deemed to be authenticated. The number of sub-sets or groups of authorized signatures is suitably chosen to trade off efficiency and storage (and, in a lesser degree, privacy) in favor of accuracy. In other words, as the number of sub-groups increases the storage requirements and processing time both increase, but the accuracy is also expected to increase.

With reference now to FIGS. 5-10, some experimental results are presented. Authentication approaches were tested on a dataset of license plates. The test subset contained 4,215 images of license plates with 2,407 unique license plate numbers. About 50% of the license plates only appear in one image instance, although some of the license plates appear more than 15 times in the dataset. The images were encoded using character attributes on top of Fisher Vectors as described in Almazan et al., "Word spotting and recognition with embedded attributes", TPAMI 6 (2014), yielding feature vectors of 604 dimensions. These vectors were then normalized using Platts scaling and then $l_2$ normalized. The character attributes and the Platts parameters were learned on a disjoint set of the dataset not used for evaluation purposes. Four one-to-many matching techniques were tested: (1) Simple sum aggregation [Sum]; (2) Generalized Max Pooling [GMP]; (3) Sum aggregation on whitened data [Whitening+Sum]; and (4) Generalized Max Pooling on whitened data [Whitening+GMP].

The evaluation procedure was performed as follows. K random elements were drawn from the database, which constituted the image set (that is, the set of authorized signatures). Then, the remaining items were tested as to whether or not they belonged to this set (that is, they served as query signatures). By varying the decision threshold, the trade-off between a high true positive rate and a low false positive rate was analyzed. This is illustrated in FIGS. 5-10 as Receiver Operating Curve (ROC) plots. For a given K, 100 different sets of size K were randomly sampled, their ROC curves were computed, and vertical averaging was performed (i.e, average the true positive rate at a given false positive rate) to obtain one single ROC plot.

As presented in FIGS. 5-10, a different ROC was produced for each set size K, with set sizes of K=4, 8, 16, 32, 64, and 128 elements presented in respective FIGS. 5, 6, 7, 8, 9, and 10. A logarithmic scale is used in FIGS. 5-10 for the false positive rate to better appreciate the behavior at very low false positive rate regimes. Some observations follow.

As expected, the simple sum aggregation was the worst performing method. On non-whitened data, computing the GMP weights consistently led to significant improvements over using weights equal to 1.

Whitening the data always helped significantly: sum+whitening was superior to sum and GMP+whitening is superior to GMP.

Sum aggregation on whitened data outperformed GMP on non-whitened data in these experiments. This is not surprising, since both formulations are very similar, but the whitening implicitly addresses a two-class problem while GMP addresses a one-class problem.

Whitening+GMP provided the best accuracy, showing that both approaches are complementary. This improvement was significant in some experiments. For example, with sets of size K=8, at a 0.01% false positive rate, the whitened sum obtained a true positive rate of 66% while the whitened GMP reached a true positive rate of 83%. With sets of size K=16, at a 0.1% false positive rate, the whitened sum obtained a 40% positive rate while the whitened GMP obtained an 80% positive rate.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An authentication system comprising:
an authenticator comprising:
   an electronic data processing device;
   a non-transitory storage medium storing instructions readable and executable by the electronic data processing device to perform an authentication process to determine whether a person or object to be authenticated belongs to a set of authorized persons or objects, the authentication process including the operations of:
   acquiring a query signature comprising a vector whose elements store values of an ordered set of features for the person or object to be authenticated;
   computing a single inner product of the query signature and a single aggregate signature comprising a vector whose elements store values of the ordered set of features for the set of authorized persons or objects wherein the single aggregate signature is not uniquely associated with any particular authorized person or object of the set of authorized persons or objects; and
   determining whether the person or object to be authenticated is a member of the set of authorized persons or objects based on the single inner product of the query signature and the single aggregate signature; and
an authenticator training component comprising an electronic data processing device configured to generate the single aggregate signature representing the set of authorized persons or objects by operations including:
generating a set of authorized signatures by acquiring a signature for each authorized person or object comprising a vector whose elements store values of the ordered set of features for that authorized person or object; and
determining the single aggregate signature by whitening the authorized signatures using a set of background signatures that are not labeled as to membership in the set of authorized signatures and aggregating the whitened authorized signatures;
wherein the determining of the single aggregate signature does not use any signature that is labeled to indicate it is an unauthorized signature that is not in the set of authorized signatures.

2. The authentication system of claim 1 wherein the person or object to be authenticated is a person to be authenticated, the set of authorized persons or objects includes only authorized persons, and the operation of acquiring the query signature comprises:
   acquiring biometric data for the person to be authenticated; and
   extracting the values of the ordered set of features for the person to be authenticated from the acquired biometric data.

3. The authentication system of claim 2 wherein the biometric data including one of an electronic fingerprint, one or more face images, and an eye scan.

4. The authentication system of claim 2 further comprising:
   a computer; and
   an electronic fingerprint reader integral with the computer;

wherein the operation of acquiring biometric data comprises causing the electronic fingerprint reader to acquire a fingerprint of the person to be authenticated; and wherein the computer is programmed to perform a login process in response to the authenticator determining the person to be authenticated is a member of the set of authorized persons.

5. The authentication system of claim 1 wherein the person or object to be authenticated is a vehicle to be authenticated, the set of authorized persons or objects is a set of authorized vehicles, and the operation of acquiring the query signature comprises:
acquiring an image of a license plate of the vehicle to be authenticated; and
extracting the values of the ordered set of features for the vehicle to be authenticated from the image of the license plate.

6. The authentication system of claim 5 further comprising:
a camera; and
a vehicle barrier gate;
wherein the operation of acquiring the image uses the camera to acquire the image of the license plate of the vehicle to be authenticated; and
wherein the vehicle barrier gate includes a gate actuator operatively connected to open the vehicle barrier gate in response to the authenticator determining the vehicle to be authenticated is a member of the set of authorized vehicles.

7. The authentication system of claim 1 wherein:
the operation of determining the single aggregate signature comprises determining the single aggregate signature to set the inner product of each authorized signature and the single aggregate signature to a target inner product value; and
the operation of determining whether the person or object to be authenticated is a member of the set of authorized persons or objects comprises comparing the single inner product of the query signature and the single aggregate signature with the target inner product value.

8. The authentication system of claim 1 wherein:
the operation of determining the single aggregate signature comprises sum aggregating the authorized signatures; and
the operation of determining whether the person or object to be authenticated is a member of the set of authorized persons or objects comprises performing a threshold operation on the single inner product of the query signature and the single aggregate signature.

9. The authentication system of claim 1 wherein the operation of determining the single aggregate signature is performed using generalized max pooling.

10. The authentication system of claim 9 wherein the generalized max pooling is performed using ridge regression.

11. The authentication system of claim 1 wherein:
the authenticator and the authenticator training component comprise different electronic data processing devices; and
the authenticator does not have access to the set of authorized signatures generated at the authenticator training component.

12. An authentication method for determining whether a person or object to be authenticated is a member of a set of authorized persons or objects, the authentication method comprising:

generating a set of authorized signatures for the set of authorized persons or objects by acquiring a signature for each authorized person or object comprising a vector whose elements store values of an ordered set of features for that authorized person or object;
determining a single aggregate signature whose elements store values of the ordered set of features for the set of authorized persons or objects by aggregating the authorized signatures of the set of authorized signatures;
acquiring a query signature comprising a vector whose elements store values of the ordered set of features for the person or object to be authenticated;
performing a single signature comparison comparing the query signature and the single aggregate signature; and
determining whether the person or object to be authenticated is a member of the set of authorized persons or objects based on the single signature comparison;
wherein one of:
(1) the determining of the single aggregate signature comprises determining the single aggregate signature to set the inner product of each authorized signature and the single aggregate signature to a target inner product value and the determining whether the person or object to be authenticated is a member of the set of authorized persons or objects comprises comparing the single inner product of the query signature and the single aggregate signature with the target inner product value; or
(2) the determining of the single aggregate signature comprises sum aggregating the authorized signatures and the determining whether the person or object to be authenticated is a member of the set of authorized persons or objects comprises performing a threshold operation on the single inner product of the query signature and the single aggregate signature.

13. The authentication method of claim 12 wherein the comparing comprises computing a single inner product of the query signature and the aggregate signature and the determining is based on the single inner product.

14. The authentication method of claim 12 wherein the person or object to be authenticated is a person to be authenticated, the set of authorized persons or objects is a set of authorized persons, the ordered set of features is an ordered set of biometric features, and the acquiring comprises:
acquiring biometric data of the person to be authenticated using a camera, fingerprint scanner, or eye scanner; and
extracting the values of the ordered set of features for the person or object to be authenticated from the acquired biometric data.

15. The authentication method of claim 14 further comprising one of:
logging into a computer in response to determining the person to be authenticated is a member of the set of authorized persons; or
admitting the person to be authenticated to a secure area in response to determining the person to be authenticated is a member of the set of authorized persons.

16. The authentication method of claim 12 wherein the person or object to be authenticated is an object to be authenticated, the set of authorized persons or objects is a set of authorized objects, the ordered set of features is an ordered set of image features derived from an image, and the acquiring comprises:
acquiring an image of at least a portion of the object to be authenticated; and extracting the values of the ordered set of features for the object to be authenticated from the acquired image.

17. The authentication method of claim 12 wherein:
the determining of the single aggregate signature comprises determining the single aggregate signature to set the inner product of each authorized signature and the single aggregate signature to a target inner product value; and
the determining whether the person or object to be authenticated is a member of the set of authorized persons or objects comprises comparing the single inner product of the query signature and the single aggregate signature with the target inner product value.

18. The authentication method of claim 12 wherein:
the determining of the single aggregate signature comprises sum aggregating the authorized signatures; and
the determining whether the person or object to be authenticated is a member of the set of authorized persons or objects comprises performing a threshold operation on the single inner product of the query signature and the single aggregate signature.

19. A non-transitory storage medium storing instructions readable and executable by an electronic data processing device to perform an authentication method to determine whether a person or object to be authenticated is a member of a set of authorized persons or objects, the authentication method comprising:
operating a camera or biometric sensor to acquire data on the person or object to be authenticated;
extracting from the acquired data a query signature comprising a vector whose elements store values of an ordered set of features for the person or object to be authenticated;
computing a single inner product of the query signature and a single aggregate signature comprising a vector whose elements store values of the ordered set of features for the set of authorized persons or objects; and
determining whether the person or object to be authenticated is a member of the set of authorized persons or objects by comparing the single inner product of the query signature and the single aggregate signature with a target inner product value:
wherein the authentication method further comprises generating the single aggregate signature representing the set of authorized persons or objects by operations including:
operating a camera or biometric sensor to acquire data on each authorized person or object;
extracting from the acquired data an authorized signature for each authorized person or object comprising a vector whose elements store values of the ordered set of features for the authorized person or object in order to generate a set of authorized signatures; and
determining the single aggregate signature to set an inner product of each authorized signature and the aggregate signature to the target inner product value.

* * * * *